UNITED STATES PATENT OFFICE 2,565,685

DRYING OIL-FURFURALDEHYDE-MESITYL OXIDE COMPOSITIONS

Mortimer T. Harvey, South Orange, N. J., assignor to Harvel Research Corporation, a corporation of New Jersey No Drawing. Application March 27, 1948, Serial No. 17,594

5 Claims. (Cl. 260—18)

This invention relates to novel compositions of matter and to methods for making them and also to products in which at least one of them is a component thereof. More particularly this invention is directed to combinations of one or more drying oils with one or more organic reaction products obtained by reacting under alkaline conditions furfuraldehyde and mesityl oxide. The organic reaction products may be in either their unthickened or heat thickened condition.

I have discovered that unique and highly useful products may be obtained by combining said reaction products in either condition with drying oils. Among some of them are novel air drying liquid products particularly useful in the preparation of paints, varnishes and other coating materials finding application in a wide variety of fields because of their alkali and acid resistance, low power factor and high dielectric strength of the film which may be either air or oven dried.

Because of its unsaturation and its relatively high boiling point, mesityl oxide is a unique reactant with furfuraldehyde for my purposes. The furfuraldehyde is reacted with mesityl oxide under alkaline conditions to provide reaction products and the mole ratio of furfuraldehyde to mesityl oxide in the reaction may be in the range of 1-1 to 2-1 but I prefer that it be in the range of 1-1 to 1.3-1.

While various materials may be employed to provide the desired alkalinity to the furfuraldehyde and mesityl oxide mix in the course of the reaction, I prefer to employ sodium hydroxide, although other materials such as potassium hydroxide, lime, etc., may be used. The quantity of alkali is preferably between about .5%-10% of the combined weights of the furfuraldehyde and mesityl oxide.

Generally for commercial production 100-200 parts by weight of furfuraldehyde is mixed with 100 parts by weight of mesityl oxide and then to this mix is added 1-3 parts by weight of sodium hydroxide usually in aqueous solution. These materials are mixed with each other in an autoclave or closed unit, or under a reflux condenser. Shortly after the mixture takes place an exothermic reaction occurs and sometimes the pressure in the reacting vessel rises to a high value. It is recommended that the sodium hydroxide be added only a portion at a time. After all of the sodium hydroxide has been added and the last exothermic reaction has been completed, the entire mass may be externally heated, and preferably to boiling to provide high yields and to thicken the organic reaction mass so produced. This heat thickening may be continued until the organic reaction mass has reached the desired viscosity at 25° C. and preferably until it is at least 50 centipoises at that temperature. The thickened mass so produced may vary from liquids to solids. If desired, the entire organic reaction mass after the last exothermic reaction may be heated under high vacuum conditions to dehydrate and remove any of the unreacted components therefrom. If desired, either before or after dehydration, the organic reaction mass may, with or without first being neutralized, be heated to thicken the mass to the desired viscosity. By this procedure there may be produced organic reaction products of viscosities varying from liquids to solids at room temperature.

The organic reaction mass which may or may not have been neutralized, is preferably dehydrated and then may be readily combined with one or more drying oils, examples of which are the unsaturated fatty acid glyceride oils such as linseed oil, chinawood oil, dehydrated castor oil, perilla oil, oiticica oil, soya-bean oil, rape seed oil, drying fish oils as well as the drying oil fractions which are derived from soya-bean oil, cottonseed oil and the like such as those disclosed in the U. S. Patents to Schaufelberger-Harvey No. 2,366,526 and Harvey-Schaufelberger 2,366,525 both issued January 2, 1945. The oils may be employed in the combination either in the raw, refined, oxidized or blown liquid state. It is preferable however that when heavily bodied or oxidized oils are employed that the additions thereto be in the liquid state rather than in the solid state because of the ease of combination. In general the organic reaction masses are mixed with said oils in the following proportions: The ratio of oil to said addition being in the range of 98-2 to 10-90 parts by weight. The mixture may then be heated at a temperature of about 225° F. or above and preferably between 400° F.-650° F. whereupon the viscosity of the mixture is increased and copolymerization of the components is effected.

I may also add a quantity of monomeric or low molecular weight polymers of styrene to said mixture of drying oil and the organic reaction product. The quantity of said styrene may be from about 1%-30% by weight of the combined weights of the oil and organic reaction product. The three components may be heated under a reflux condenser or in a closed chamber at 200° F. or above to obtain a copolymerization product.

In any case, with or without the styrene, the mass is heated until the desired viscosity is obtained, the viscosity being dependent on the ultimate use of the product. In some cases, the bodied product may be applied directly to a base, such as a fabric, an electrical conductor or the like, in a film which is allowed to air dry or is baked to dryness in an oven. Generally for such purposes, it is first thinned with a solvent such as mineral spirits, VMP naphtha, etc. and the solution is applied directly to the fabric or conductor after which the solvent is driven off and the product remains as a thin film. Such solutions find particular application when the products are to be used as binders in brake linings, as cable cloth impregnants, as insulator coatings for transformers, electric motor parts, etc.

The following Examples A–D are specific methods for producing some of the organic reaction products. These examples are set forth merely as illustrations and are not to be construed in a limiting sense.

Example A 200 grams of mesityl oxide, 195 grams of furfuraldehyde and 4 grams of sodium hydroxide in 8 cc. of water were mixed together whereupon an exothermic reaction occurred. At the termination of said reaction water separated at the top. The mass may be refluxed at 200° F.–230° F. for a period up to one hour. The mass is then dehydrated at temperatures up to 160° C. A yield of 300 grams of an oily material, having a viscosity of approximately 100 centipoises at 25° C. was obtained and is hereinafter known as product A.

Example B 2 pounds of mesityl oxide and 2 pounds of furfuraldehyde are mixed together in a reaction chamber containing a reflux condenser and stirring equipment. To this mixture is added a solution of 18 grams of NaOH in 56 grams of water. The temperature of the mass rises to 80° C. After about ½ hour an additional 18 grams of NaOH in 18 grams of water is added to the mass and the temperature rises to 100° C. without any external heat being applied. The water separates on the top and boils by itself. The mass was then allowed to stand overnight. Upon heating and dehydrating to 120° C. a secondary reaction occurs where the temperature goes to 135° C. and the mass suddenly becomes a brittle solid. The yield was approximately 3 pounds 10 ounces of a dark brown product known hereinafter as product B, had a specific gravity of around 1.2 to 1.25, is soluble in hot linseed oil, insoluble in boiling sodium hydroxide, weak and dilute, soluble in acetone, partially soluble in alcohol. Ash was less than 1%, the melting point over 40°. It is miscible with polyvinyl styrene and normally solid polyvinyl butyral and polyvinyl acetate.

Example C 200 grams of mesityl oxide and 100 grams of furfuraldehyde are mixed together and to this mix is added a solution of 6 grams of sodium hydroxide in 12 grams of water. A slight exothermic reaction occurred and then the mass was refluxed for 1 hour at 100° C. Subsequently it was heated to 140° C. to dehydrate and drive off the excess mesityl oxide giving a yield of 210 grams of an oily liquid known hereinafter as product C, which has a viscosity at 25° C. of approximately 100 cp. and is soluble in hot linseed oil.

Example D 1 pound of mesityl oxide and 1 pound of furfuraldehyde are mixed together and to this mix is added 13½ grams of NaOH in approximately 15 grams of water. An exothermic reaction occurs and then the mass is refluxed for 1 hour at around 100° C. The mass was then distilled to 155° C. to dehydrate and drive off 125 grams of excess mesityl oxide giving a yield of 1 pound 8 ounces of an oily liquid showing a coupled reaction of one mole of mesityl oxide to approximately 1⅓ mole of furfuraldehyde. Said oily product, known hereinafter as product D, has a specific gravity at 25° C. of 109 and a viscosity of 95 cp. at 25° C., is soluble in hot linseed oil, alcohol and VMP naphtha and its color was brown.

The following Examples 1 to 5 are specific methods for producing some of the products of this invention and are set forth merely as illustrations and are not to be construed in a limiting sense, all parts being given by weight unless otherwise specified:

Example 1

To 98 parts of one or a combination of two or more of said oils is added 2–900 parts of one of said reaction products in either its unthickened or heat thickened condition such as product A–D, for example. This mixture with or without the addition of other materials is heated at 225° F. or above and generally between 400° F.–600° F. to effect what appears to be copolymerization and in any event until the viscosity of the mix is considerably increased. The resultant material may be heated at about 600° F. by itself, with or without other additions whereby it may be converted to the substantially solid state at that temperature. These products find use as ingredients in floor tiles, recording records, synthetic rubber, brake linings, electrical insulating coatings, paints and varnishes.

In the brake lining field the copolymerization product before being converted to the solid state at 600° F. may be thinned with appropriate solvents and such a solution is employed as an impregnant for a asbestos and the like after which the so impregnated material which may be in the finely divided, matted or woven state may be heated to drive off the solvent and the copolymer may be converted to the substantially solid state capable of withstanding temperatures as high as 600° F. In such a product, the copolymer acts as a binder. If desired, the copolymer may be converted to the solid state at 600° F. and then comminuted whereby at least 95% thereof passes a 20-mesh screen and this comminuted material may be employed as a friction augmenting material in brake linings.

Example 2

387 grams of Castung (dehydrated castor oil), 113 grams of blown pitch, 75 grams of product B, 129 grams of kettle bodied linseed oil, 470 grams of mineral spirits (solvent) and 1.25 grams driers (containing 8% lead and 8% manganese). The aforesaid formulation is that of a baking varnish and may be produced by mixing the dehydrated castor oil with product B. This mixture is heated to around 575° F. for about 10–15 minutes in order to obtain solution. Then the blown pitch and linseed oil are added thereto and this mixture is maintained at 575° F.–600° F. for about 1 hour to obtain the desired viscosity. Then the solvent and driers are added thereto and mixed therewith to provide a varnish which may be used for coating paper, cloth, metals, electric conductors, etc. The so-coated and/or impregnated bases may then be dried in an oven at 225° F.–325° F. whereby there is provided thereon a substantially and dry acid-resistant and alkali-resistant film having a low power factor characteristic and high dielectric strength under humid conditions.

*Example 3*

200 grams of alkali refined raw linseed oil and 200 grams of product D are heated together at 600° F. for about 3 hours whereupon the whole mass gelatinizes to a tough, rubbery product which finds utility in the manufacture of linoleum, rubber compositions and brake linings.

*Example 4*

200 grams of alkali refined raw linseed oil, 200 grams of product A, C or D or combinations thereof are heated to 600° F. and after about 45 minutes at that temperature the mass is very heavy and is approximately 350 grams in weight. The mass may be cooled and thinned with 350 grams of petroleum spirits, and there is also added thereto 6.25 cc. of lead driers (16% lead by weight) 1.60 cc. of cobalt driers (6% cobalt by weight) and 0.83 cc. of manganese driers (6% manganese by weight). This product may be used as a clear air drying and alkali-proof coating. If desired there may be added thereto 800 grams of a pigment such as Titanox B (titanium dioxide precipitated on barium). The mass may be ground on standard paint rollers, thinned to the proper consistency and used as an air-drying coating material which in film form dries in approximately 2 hours.

*Example 5*

Alkali refined raw linseed oil may be appreciably thickened when only two parts of product D to 98 parts of said oil are maintained at 575° F.–600° F. for a much shorter period of time than that required to thicken the linseed oil to the same viscosity, employing the same temperature and without the presence of said product D. For example, into each of two separate containers was poured 200 grams of alkali refined raw linseed oil taken from the same batch. Into one of the containers containing linseed oil was added 20 grams of product D. Both of the containers with the products therein were heated to 575° F.–600° F. under the same conditions and were maintained under the same conditions for 4 hours. At the end of this period the resultant products were examined and it was found that the linseed oil and product D combination had jellied while the linseed oil in the other container had become only moderately thin-bodied.

Having thus described my invention, what I claim is:

1. The method comprising heating together at about 400° F.–650° F. a drying fatty oil and an organic reaction product obtained by reacting under alkaline conditions furfuraldehyde and mesityl oxide in the mole ratio of 1–1.3 moles of furfuraldehyde to 1 mole of mesityl oxide, the ratio of said oil to said reaction product being in the range of 98–2 to 10–90.

2. The method comprising heating together at about 400° F.–650° F. linseed oil and an organic reaction product obtained by reacting under alkaline conditions furfuraldehyde and mesityl oxide in the mole ratio of 1–1.3 moles of furfuraldehyde to 1 mole of mesityl oxide, the ratio of said oil to said reaction product being in the range of 98–2 to 10–90.

3. A brake lining comprising asbestos and a solid product made in accordance with the method of claim 1.

4. A product made in accordance with the method of claim 1.

5. A product made in accordance with the method of claim 2.

MORTIMER T. HARVEY.

REFERENCES CITED

The following references are of record in the file of this patent:

UNITED STATES PATENTS

| Number | Name | Date |
|---|---|---|
| 1,441,598 | Phillips et al. | Jan. 9, 1923 |
| 2,239,232 | Huyser | Apr. 22, 1941 |
| 2,363,829 | Caplan et al. | Nov. 28, 1944 |

FOREIGN PATENTS

| Number | Country | Date |
|---|---|---|
| 386,013 | Germany | Dec. 1, 1923 |